(12) United States Patent
Wong (10) Patent No.: US 8,813,514 B2
(45) Date of Patent: Aug. 26, 2014

(54) GEOTHERMAL RAIL COOLING AND HEATING SYSTEM

(76) Inventor: Robert Hon-Sing Wong, Federal Way, WA (US)

( * ) Notice: Subject to any disclaimer, the term of this patent is extended or adjusted under 35 U.S.C. 154(b) by 131 days.

(21) Appl. No.: 13/568,087

(22) Filed: Aug. 6, 2012

(65) Prior Publication Data

US 2014/0033755 A1    Feb. 6, 2014

(51) Int. Cl.
*F25B 27/00*    (2006.01)
(52) U.S. Cl.
USPC ........................................... 62/235.1; 62/260
(58) Field of Classification Search
CPC .......... F25F 13/00; F25F 30/06; Y02B 10/20; Y02B 30/13; F24F 5/0046; F25D 17/02; F25D 16/00
USPC ............................ 62/238.7, 260, 235.1, 185
See application file for complete search history.

(56) References Cited

U.S. PATENT DOCUMENTS

| | | | | |
|---|---|---|---|---|
| 5,000,798 A | * | 3/1991 | Nott et al. ...................... | 148/581 |
| 5,852,939 A | * | 12/1998 | Gazes ............................. | 62/260 |
| 5,937,665 A | * | 8/1999 | Kiessel et al. .................. | 62/260 |
| 5,941,482 A | * | 8/1999 | Santagata ...................... | 246/428 |
| 6,361,625 B2 | * | 3/2002 | Fujikake et al. ............... | 148/333 |
| 6,547,897 B2 | * | 4/2003 | Moser et al. ................... | 148/582 |
| 6,615,602 B2 | * | 9/2003 | Wilkinson .................... | 62/238.7 |
| 6,727,470 B2 | * | 4/2004 | Reichle .......................... | 219/213 |
| 6,762,395 B2 | * | 7/2004 | Yagnik et al. .................. | 219/540 |
| 7,150,160 B2 | * | 12/2006 | Herbert ........................... | 62/274 |
| 7,234,314 B1 | * | 6/2007 | Wiggs ......................... | 62/235.1 |
| 8,586,896 B2 | * | 11/2013 | Reichle .......................... | 219/213 |
| 2002/0174673 A1 | * | 11/2002 | Wilkinson ...................... | 62/260 |
| 2003/0146207 A1 | * | 8/2003 | Reichle .......................... | 219/635 |

* cited by examiner

*Primary Examiner* — Mohammad M Ali (57) ABSTRACT

A Geothermal Rail Cooling and Heating System is a reversible system process that accelerates heat transfer between the steel rail used in railway track and the adjacent earth. It is comprised of the Rail Heat Exchangers specially shaped to fit tightly inside the rail web, a refrigerant cycling on its physical condensing and evaporative characteristics, a mechanical and power supply system, and an underground tubing loop system for heat dissipation or absorption. When the railroad track undergoes a range of temperature changes that results in rapid rail expansion, it may cause track buckling or sun kink. Upon detection of such occurrence, the system responds with cooling effect to slow down expansion, and simultaneously reduce the risk of track failure. By switching the direction of refrigerant flow utilizing the system built-in reversing valve, the function is alternated for the evaporator and condenser to enable heating instead of cooling.

15 Claims, 7 Drawing Sheets

RAIL GEOTHERMAL COOLING/HEATING SYSTEM LAYOUT

FIG.1 NATURAL HEAT TRANSFER IN RAIL

FIG. 2 TYPICAL RAIL RESTRAINING & FASTENING SYSTEM

FIG. 3 RAIL GEOTHERMAL COOLING/HEATING SYSTEM LAYOUT

FIG. 4 GEO-ENCLOSURE ASSEMBLY

FIG. 5 RAIL HEAT EXCHANGER

FIG. 7 DEVICE CIRCUIT SCHEMATIC

FIG. 8 NOMENCLATURE OF RAIL SECTION

GEOTHERMAL RAIL COOLING AND HEATING SYSTEM

REFERENCES CITED

U.S. Patent Documents

| | | |
|---|---|---|
| 6,079,631 | June 2000 | Ortwein, et al. |
| 6,460,535 | October 2002 | Nisewander, et al. |
| 3,999,276 | December 1976 | Brown, et al. |
| 7,845,578 | December 2010 | Cox, et al. |
| 5,735,458 | April 1998 | Brown, et al. |
| 4,379,521 | April 1983 | Young, et al. |
| 5,267,634 | December 1993 | Bruning |
| 4,448,350 | May 1984 | Phillips |

OTHER REFERENCES

Pavement Snow Melting, John W. Lund, Geo-Heat Center, Oregon Institute of Technology, Klamath Falls, Oreg.

Railroad Engineering, Second Edition, ISBN 0-471-36400-2, William W. Hays.

Derailment of Amtrak Train No. 58, City of New Orleans, near Flora, Miss. Apr. 6, 2004, Railroad Accident Report NTSB/RAR-05/02, PB2005-916302 Notation 7642A, National Transportation Safety Board, Washington D.C.

Heated Bridge Technology, Report on ISTEA Sec. 6005 Program, U.S. Department of Transportation Federal Highway Administration, Publication No. FHWA-RD-99-158 July 1999.

Modern Refrigeration and Air Conditioning, Goodheart-Willcox Co., Inc., 1975, ISBN 0-87006-196-8, Althouse Turnquist Bracciano.

TECHNICAL FIELD OF THE INVENTION

The present invention relates to providing a new solution based on application of geothermal technology to enhance current practice used by the railroads in restraining longitudinal rail movement in railroad track due to the effects of thermal expansion and contraction.

BACKGROUND ART

Despite the latest technological advancements made in railway track design, material development, and construction methodology, rail movement due to temperature variations still remains a costly and formidable challenge to many in the maintenance of way profession. Longitudinal expansion in rail due to radiant heating by the sun in summer causes track distortion and buckling, but successive contraction in winter also causes breakage in rail. This natural opposing behavior of rail has revealed its prominence and impact on operational safety and cost since the birth of railroad. Especially in territories where drastic difference in temperature encountered in seasonal change, difficulty level for the task in maintaining a safe railroad often magnifies itself exponentially under extreme weather conditions. Heat elicits shape change in material whose behavior is governed by physical properties, but no matter how distinctive physical change may vary in magnitude, all materials respond simultaneously in similar manner when subjected to heat or cold. The technique currently employed to cope with rail expansion problem on the railroad is by rail anchoring and rail length adjusting with cutting and welding to maintain track stability. Over the years, the railroad industry as a whole seems saturated in belief that rail thermal expansion in track is an inherent physical fact of life, and satisfied by the effective counter measure in place. The industry also has learned to live with a track structure with perpetual movement and instability, and contemplated that the threat of heat is only temporary during the day. Once temperature goes down, the problem resolves by the natural process of heat dissipation in the air. This is probably the reason leading to numerous inventions related to the prior art in the development of more restraining products and railroad tie systems, and yet not much is evident in gain of new technology departing from it with resolution to reducing the amount of heat exchanged in the rail.

The common term "Heat" is defined as internal energy or more precisely as thermal energy that flows from a system of relatively high temperature to one at a relatively low temperature. It is also called molecular translational energy due to the kinetic nature of molecule movement. Temperature is defined as a measure of the average molecular translational energy in a system, and the greater the change in temperature for most materials, the greater the amount of thermal expansion or contraction.

Using the value of 0.12 BTU/lb.° F. as specific heat Cp for rail steel, the weight of 45.3333 lb./ft. for a 1,500 ft. long 136 lb. RE rail, and a temperature change of 60° F., the change of internal energy will be:

$$Q = 45.3333 \text{ lb./ft.} \times 1500 \text{ ft.} \times 0.12 \text{ BTU/lb.}° \text{F.} \times 60° \text{F.}$$

$$Q = 489,600 \text{ BTU or } 143.28 \text{ KWH}$$

When a rail is free to move without restraint, it changes 0.0000065 inch per inch of its length per degree Fahrenheit change in temperature. Therefore the same rail of 1,500 feet long undergoes a temperature change of 60° F., a normal linear expansion of 7.02 inches will result as the addition in length. In railroad operation, this physical expansion must be restrained for practical reasons. It is accomplished by application of rail anchors or elastic fasteners appropriately in consideration of track geometry and rail laying arrangement. However the method employed to stop rail movement also gives rise to an internal force equal and opposite the sum of restraining forces applied by the restraining appurtenances.

For every 1° F. change in temperature, 195 psi is the internal stress set up in the rail by restraining forces, based on the stress-strain relationship of:

$$\text{Stress} = 0.0000065 \text{ in/in} \times 30,000,000 \text{ psi} \times \Delta T° \text{ F.}$$

Consequently, to restrain a 136 lb RE section rail with a cross-sectional area of 0.0929 sq.ft. (13.3776 sq.in.) and with a temperature change of 60° F.:

$$\text{Force} = \text{Area} \times 195 \text{ psi/}° \text{ F.} \times \Delta T° \text{ F.}$$

$$\text{Force} = 13.3776 \text{ sq.in.} \times 195 \text{ psi/}° \text{F.} \times 60° \text{F.} = 156,518 \text{ lbs. or } 78.26 \text{ tons}$$

When the rail is restrained in such a way that its expansion disallowed but yet its internal energy increases due to rise in temperature, the force developed internally is compressive in nature. Therefore, the rail is said to be in compression. Catastrophic failure in lateral distortion (bulge) out of straightness is called track buckling.

Contrary to foregoing, when the rail is restrained and disallowed to contract, the force developed internally is tensile in nature. Subsequently, the rail is in tension. Catastrophic failure in rail breakage is called pull apart.

Conspicuously, the impact on railroad track structure by forces in such magnitude cannot be ignored while railroads operate to comply with stringent safety requirements and the insatiable demands for higher speed and axle load from freight and passenger traffic. Buckled track has always been a major concern in the railroad industry. Incidents of such occurrence often lead to derailment and wreckage, and have been steadily growing since the introduction of the Continuous Welded Rail (CWR). Industry-wide in the United States, railroads are experiencing numerous buckled track derailments each year. By nature of safety concern for rail passengers, communities adjacent to railroad right of way, and hazardous material freight operations, no railroad or transit authority can tolerate risk of buckled track. In a different perspective, some argue that buckled track is not a cause but the consequence of some deficiency in the track structure or track maintenance procedures. A properly constructed and maintained piece of track should not buckle from thermal loading during normal seasonal variations of temperature. Something else, whether or not apparent to the naked eyes, must be present for buckling to occur, such as misalignment, inadequate ballast section, loss of neutral temperature, rail anchor deficiency, elastic fastener deficiency, and inadequate water drainage etc.

In another aspect, thermal forces developed in the rail remain in the track system, and the magnitude of these forces is proportional to the rail temperature. Therefore, the risk for a track to buckle is higher when the temperature is higher. The culpable factor is the heat, and because of it problem follows. Although good construction and maintenance practice to resolve this problem by applying powerful and sophisticated restraining device to control rail movement and transfer the load to the ground, the method does not remove heat from the rail. Rail anchors and elastic fasteners transmit thermal forces to the railroad ties. The railroad ties are in turn restrained by the track ballast. Therefore any change to the soil condition that compromises the delicate balance may release these forces, and often suddenly lead to catastrophic consequences. Since the occurrence of track buckling is directly related to radiant heating by the sun, it is often called Sun Kink.

To combat track buckling or sun kink, CWR track must be carefully laid and adjusted to the neutral temperature of the area. The method of heating to expand rail is often used to lay or adjust CWR track, if the actual rail temperature is less than the neutral temperature. The amount of rail adjustment must be calculated based on the difference of the rail actual temperature and the desirable neutral temperature, the length of rail to be adjusted, and the coefficient of expansion for rail steel. Space equal to the amount of expansion needed for each string of CWR should be provided between the end of that string and the near end of the next adjacent string. A minimum of 10 ties should be box anchored on the near end of the adjacent string to hold it in place and avoid closing the expansion gap of the string being heated. The rail also needs to be tapped slightly with sledgehammer to free itself from friction sitting on tie plates and advance in the direction of expansion. Uniformity of expansion is controlled by marking each quarter of the string and introducing expansion as ¼ point, ½ point, and ¾ point. CWR should be heated so that expansion is introduced from one end of each string to the other. Heat should be steadily applied while moving forward until the required expansion has been obtained at the end of each string. As adjusting in progress, a minimum of 4 ties should be boxed anchored per 39' of rail to prevent the rail from losing adjustment. At the end of the completely expanded string, a minimum of 20 ties should be box anchored immediately after the gap is closed to hold the expansion.

Standard practice of track maintenance requires an adequate ballast section. To reduce lateral and vertical sun kinking, full cribs, good drainage, and sufficient shoulders of satisfactory grade ballast are required. A minimum shoulder of 6 inches is mandatory, but for safe dependable restraint under all thermal and axle load conditions, a 12 inches shoulder is preferred. Continuous welded rail track should be disturbed as little as possible, and should not be disturbed at all for maintenance purposes when in compression and showing signs of possible displacement, for example observation of edge space in tie crib and series of directional movement of rail anchors along rail base. Any disturbance to ballast compaction lessens lateral restraint against sun kinks, and a high percentage of such occurrences resulted in derailments. When a sun kink occurs under a train, the derailment usually occurs with several cars behind the locomotive. Because the rail tends to expand in the direction of least resistance, it often expands upward sufficiently to free it from lateral restraint and then it distends laterally. Sun kinks are likely to occur in the spring as the rail adjusts to the warmer weather, and again in the fall as colder temperatures call for a change in summer procedures.

Anchoring continuous welded rail (CWR) track usually calls for box anchoring every tie for 200 feet on each end of the CWR string, and also at railroad crossing approaches, and then box anchor every other tie in between to protect against rail breaks and normal running. Conventional CWR tie restraint is practiced on ballast deck bridges but not on open-deck structures, where damage to bridge timber would occur. With short single spans it is customary to box-anchor every tie for 200 feet at each end of the bridge and omit rail anchors on the bridge deck. For longer structures either jointed rail is used or one or more sets of expansion joints are installed to allow for unrestrained rail movements. Due to the unrestrained rail movement on open-deck bridge or similar structures, operational issue persists in hot summer months regardless of high maintenance efforts and costs to ensure safe operation of train traffic over these structures.

Historical development of the heat pump dates back in time of Lord Kelvin, William Thomson, in Great Britain 1852, and in association with his famous work "The Theory of Dissipation of Energy". In several papers on this subject, he pointed out that motive power was obtained only by 'degrading' heat, i.e. burning fuel, and that the heat thereby rejected represents energy dispersed and 'unavailable' as further motive power. He therefore outlined and designed a machine which he called a Heat Multiplier, the predecessor of what we are familiar with today as Heat Pump. This machine would permit a room to be heated to a higher temperature than the ambient temperature, by using less fuel in the machine than if such fuel was burned directly in the furnace. However, a real machine for heating building using Kelvin's cycle and specification was never built in U.K. at the time of disclosure despite of her critical fuel resources. Unlike in the United States where the number of domestic heat pumps used for either space cooling or heating exceed millions. Heinrich Zoelley patented the idea of using heat pump to draw heat from the ground in 1912. The first commercial heat pump was put in use to heat the Commonwealth Building in Portland Oreg. in 1946.

Today, geothermal ground source heat pump is commonly used in the HVAC system for the LEED accredited building projects, not just for promulgating an image of green or sustainable energy utilization but for operating cost saving on a long range basis. It is a central heating or cooling system that pumps heat to or from the ground. It uses the earth as a heat source in the winter or a heat sink in the summer. The upper 10 feet of Earth's surface maintains a nearly constant temperature between 50° F. and 60° F. Like a refrigerator or air conditioner, the system uses a heat pump to force the transfer of heat to and from the ground. Heat pump transfers heat from a cool space to a warm space, against the natural direction of flow, or it can enhance the natural flow of heat from a warm area to a cool one. The core of the heat pump is a loop of refrigerant pumped through a vapor-compressor refrigeration cycle that moves heat. A refrigeration cycle is comprised of operations by a compressor, condenser, expansion valve, and evaporator. The refrigerant agent vapor enters the compressor through the suction port from the evaporator, compressed and then ejected with high temperature and high pressure to the condenser coil. In the condenser coil, the superheated refrigerant vapor must give up its heat and turns into liquid and accumulates in the liquid receiver before reaching the restrictive expansion valve. Once passing through the expansion valve, this refrigerant liquid is allowed to expand and boil vigorously become vapor again in the evaporator coil. Since the phase change from liquid to vapor necessitates latent heat of evaporation, heat must be drawn from the surrounding of the evaporator coil to sustain this physical transformation. Therefore heat is taken in by the refrigerant vapor while moving through the evaporator coil before reaching the suction portion of the compressor for the repeated process. The evaporator and condenser exchange heat with the space surrounding, and with the water-glycol solution which absorbs or dissipates heat through the tubing loop system buried underground. Since heat is taken away from the space surrounding, it provides cooling effect to the space. Reversibly, by exchanging the flow, the system provides heating effect to the space. This process continues until the desirable temperature for the room space has been reached.

SUMMARY OF THE INVENTION

A geothermal rail cooling and heating system, in accordance with the present invention, comprises of a rail heat exchanger, a mechanical device configured as a ground source or air source heat pump, solar energy/battery or AC electrical power supply, structural enclosure for all assembly components, and mechanism to circulate water-glycol solution in the system to facilitate the flow of heat energy when the rail temperature reaches a critical value.

In the order of hierarchy, the lead component in this invention is the rail heat exchanger. It is the piece in contact with the rail to provide an expedient path for accelerated heat dissipation that simultaneously reduces longitudinal rail expansion. Railroad track under the hot sun is subject to all three forms of heating condition, i.e. radiation, conduction, and convection. Depending on location where direct exposure to sunlight or partially shielded by shady shelter attribute to its internal energy rise, a long rail may register different temperature readings in a short distance. Other factors like wind draft, precipitation, humidity, and altitude may affect the complex science of how heat flowing in and out of the rail by the three forms of heat transmission in the field. Nevertheless, it is a common knowledge that rail tends to cool down to ambient temperature at night, but heats up rapidly by mid morning with a temperature difference as much as 60° F. in hot summer months. Actual rail temperature measured on a hot day is commonly found 25 to 35° F. higher than the air ambient temperature. When the rail heat exchanger is attached to the rail, heat flow right angle to the contacting surface is established at the interface between the rail web area and the conductor plate of the rail heat exchanger. Since thermal energy naturally flows from high temperature to low temperature to maintain equilibrium, a continuous heat flow by conduction is established from the adjacent portion of the rail to replenish heat loss in area closer to the portion of rail in contact with the rail heat exchanger. One can easily visualize this process procreates an effect of thermal gradient throughout the length of rail, however infinitesimal it may seem when measured incrementally further away from the contact zone. This is an important aspect of this invention, because heat extraction from the rail is not limited to a localized spot but effectively applicable over a greater length of the rail.

Once transmission of heat energy is completed by means of conduction, forced convection takes over the heat transfer process inside the rail heat exchanger by the evaporation of refrigerant agent as coolant. The refrigerant agent, in vapor form, must acquire heat from the surrounding as bounded by the universal law of thermodynamics "Latent Heat of Evaporation", and so it takes the heat along into compression. After compression resulting in high temperature and high pressure, it condenses into liquid by giving up the heat through the condenser coil. The heat pump condenser coil in turn performs a heat transfer with a batch of water-glycol solution that circulates through the tubing loop in the ground. As the compression cycle repeats itself, the process of heat transfer continues from the rail through the rail heat exchanger and the heat pump, and eventually to the ground for heat dissipation or to other renewable energy means that transforms heat energy to other use.

The construction of the rail heat exchanger consists of the following components:
1. A metal heat conductor plate shaped to mate with rail for optimized heat conduction.
2. An evaporator coil formed by copper tubing.
3. Wood frame reinforcements.
4. Fiber-glass insulation.
5. Steel frame casing.
6. Polyurethane shell.

The heat conductor plate is shaped to receive heat transfer from the rail right angle to its surface for maximum efficiency. The copper evaporator coil is soldered or brazed on the conductor plate to form the primary heat conductor sub-assembly. This sub-assembly is reinforced by wood side frames and longitudinal steel frame for structural integrity. Once the rough framing for the assembly is established, fiber-glass insulation is added to shield the assembly from heat transferring between the conductor and the atmosphere. The intent is to make heat transfer only between the rail and the conductor. No heat is intended to reach the conductor from the atmosphere. Before the entire assembly is sealed by an outer shell of polyurethane casting resin, insulated flexible tubing is connected to the intake and discharge ports of the evaporator coil. Glossy and reflective color paint is applied to the final product to reflect away sunlight, an extra cautionary effort to reinforce uni-directional heat transfer. The rail heat exchanger is installed on the field side rail by mechanical fasteners, bolts, c-clamps, spring clips etc.

The mechanized device that enables the thermodynamic cycle of the refrigerant agent (R-134a or R-410a) comprises a compressor pump, condenser heat exchanger, liquid receiver, thermostatic expansion valve, and flow reversing valve. The device configured to support this invention utilizes the universal thermodynamic principle as employed by a ground source or air source heat pump, but defers in application. Prior art is conditioning air or providing comfort in space living while the current invention is aiming to enhance rail safety by lowering rail temperature that simultaneously reduces stress and strain in rail. As the superheated and high pressure refrigerant vapor is ejected from the compressor, it releases the heat while passing through the condenser coil in condenser heat exchanger and condenses into a liquid. The condensed liquid refrigerant is collected in the liquid receiver. The heat released in condenser coil is transferred to the water-glycol solution circulating between the condenser heat exchanger and the tubing loop in the ground, and eventually dissipated. The suction from the compressor draws the refrigerant liquid, which is now at a lower temperature but is still under high pressure, to pass through the thermostatic expansion valve. Once passing through the valve, the refrigerant is allowed to expand and boil vigorously as vapor into the Rail Heat Exchanger serving the function as evaporator. Thermodynamic phase change from liquid to vapor necessitates latent heat from the surrounding to sustain transformation, and the supply of heat comes from the conduction of rail through the rail heat exchanger conductor plate. The refrigerant vapor carries this heat into the suction of the compressor, and the cycle continues until the system setting for temperature control is reached. Reversing the flow of refrigerant in the system, simply alternate the function of cooling or heating of the rail heat exchanger.

This arrangement of heat pump mechanical device can be either powered by a solar panel and battery system or AC electrical power supply. The demand for power is determined by the thermal couples attached to the rail. When the rail temperature reaches a pre-set value, power will turn on automatically and stay on to run the system until the temperature in the rail drops down to an acceptable level. The application as such is able to enhance regulate the actual rail temperature in areas prone to track buckling or sun kink. When solar power is chosen to energize the system, the photovoltaic panel collects solar energy and transforms it into electrical energy, which will be stored in a battery bank of 12V DC configuration. The demand for self-sufficient power by the system is timely coincidental when the rail gets hot, while concurrently collecting solar energy to keep battery charged.

Other than the rail heat exchanger, ground tubing loop, and the solar energy collector panel, all components of the system are mounted inside a steel structural hollow enclosure that serves the purpose of a railroad cross tie. It utilizes standard railroad track fasteners to attach itself underneath the track, and the rails are insulated from coming in contact with steel to prevent shunting. Since the steel structural enclosure is buried in ballast under the track, the ground tubing loop can be easily connected to the system. A multiple of this "tie enclosure" in support of the geothermal rail cooling and heating system is expected to be used at required intervals along the track in order to be effective. Each structural enclosure supports cooling or heating both pieces of rail in track. Therefore both rails receive the same amount of heat flow at the same tie location, thus minimizing the possibility of differential shifting by individual rail as found in rail expansion joint. The ability to lower rail temperature in summer months offers many benefits, but raising rail temperature moderately in winter months according to its rail laying temperature also offers advantageous considerations. Ground temperature below frost line with only a few exceptions is consistent all over the globe. At a depth of about 10 feet, the ground temperature has been in between 50 to 60° F. all year around, which is much warmer than the surface temperature in the winter months. When the flow of refrigerant agent is reversed effecting the role change between the evaporator and condenser, heat is extracted from the ground by heat exchange between the refrigerant vapor and the circulating glycol-water solution. This heat can be monitored and regulated to disperse in rail reducing tensile stresses and also for moderate de-icing and snow melting. This application may be of special interest to installation of special track-work involving movable-point frogs, spring rail frogs, double slip switches, diamond crossings, insulated rail joints, direct fixation fasteners, and high speed switch and turnouts where rail pulling is affecting delicate dimensional compliance. Ground source heat flow to the rail through the application of Geothermal Rail Cooling and Heating system reduces the effort in snow and ice removal for special trackwork.

Still other objects and advantages of the present invention will become readily apparent to those skilled in this art from the following detailed drawings, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 3 shows the general layout of the Rail Geothermal Cooling and Heating system. For effective results, more than one system installation is considered in track, and the decision depends on site specific for quantity required. In a steady-state transfer, heat flow inside a rail is by conduction. When the Rail Heat Exchanger is attached to the rail, the cooling effect immediately creates a thermal gradient in close proximity to the contact area of the rail. This is explained by the Fourier's Law of Heat Transfer as follows:

$$Q1\text{-}2 = -kA(T2-T1)/L$$

Q1-2=Quantity of heat transferred from high temperature Point 1 to low temperature Point 2, (BTU/hr)
K=Thermal Conductivity for rail steel≈25 BTU-Ft/Hr-° F.-Ft$^2$
A=Cross Sectional Area for 136 lb. RE Rail section, 0.0929 Ft$^2$
L=Distance between Point 1 and Point 2 along the rail (Ft)
T1=Temperature at Point 1, representing actual rail temperature (° F.)
T2=Temperature at Point 2, adjacent to Rail Heat Exchanger (° F.)

The effective rate of heat transfer is greatly dependent on overall system design considerations.

The components of Geothermal Rail Cooling and Heating System are assembled and connected within an enclosure which is fabricated of structural channel steel, and for the ease of description from this point onward the assembly is now called "Geo-enclosure". This fabricated assembly has the equivalent structural integrity as a railroad tie, and so it occupies the tie space as such. Since the Geo-enclosures are buried in track ballast, it is easy to make direct connection of the underground tubing loop to the mechanical components inside the enclosure. The power supply supported by solar energy panel and battery system is shown installed just outside the clearance limit of the railway track adjacent to each Geo-enclosure.

The ground loop also serves as a heat exchanger to dissipate or absorb heat to and from the ground. The design for ground loop can be vertical or horizontal under each tie location or in the adjacent right of way to the condition of a steady-state heat flow as follows:

$$Qc = L(Tg - Tw)/R$$

Where,
  Qc = Heat flow rate (BTU/hr.)
  L = Tubing length (feet)
  Tg = Ground temperature (° F.)
  Tw = Water-glycol coolant temperature (° F.)
  R = Thermal resistance to heat transfer (Hr-Ft-° F./BTU)

FIG. 4 discloses the major components of the Geothermal Rail Cooling and Heating System. Rail Heat Exchangers, refrigeration compressors, heat exchangers for use as evaporator and condenser, circulator pump, and coolant reservoirs. For clarity refrigerant and coolant tubing and connection are not shown in this figure, but the details are illustrated in FIG. 7 to follow.

BEST MODE FOR CARRYING OUT THE INVENTION

The foregoing detail description and drawings outlining the prior art in practice and the thermodynamic principles utilized in the invention of Geothermal Rail Cooling and Heating system are sufficient for any person of ordinary skill in this art to make and use this invention without extensive research and experimentation.

Figure 1:
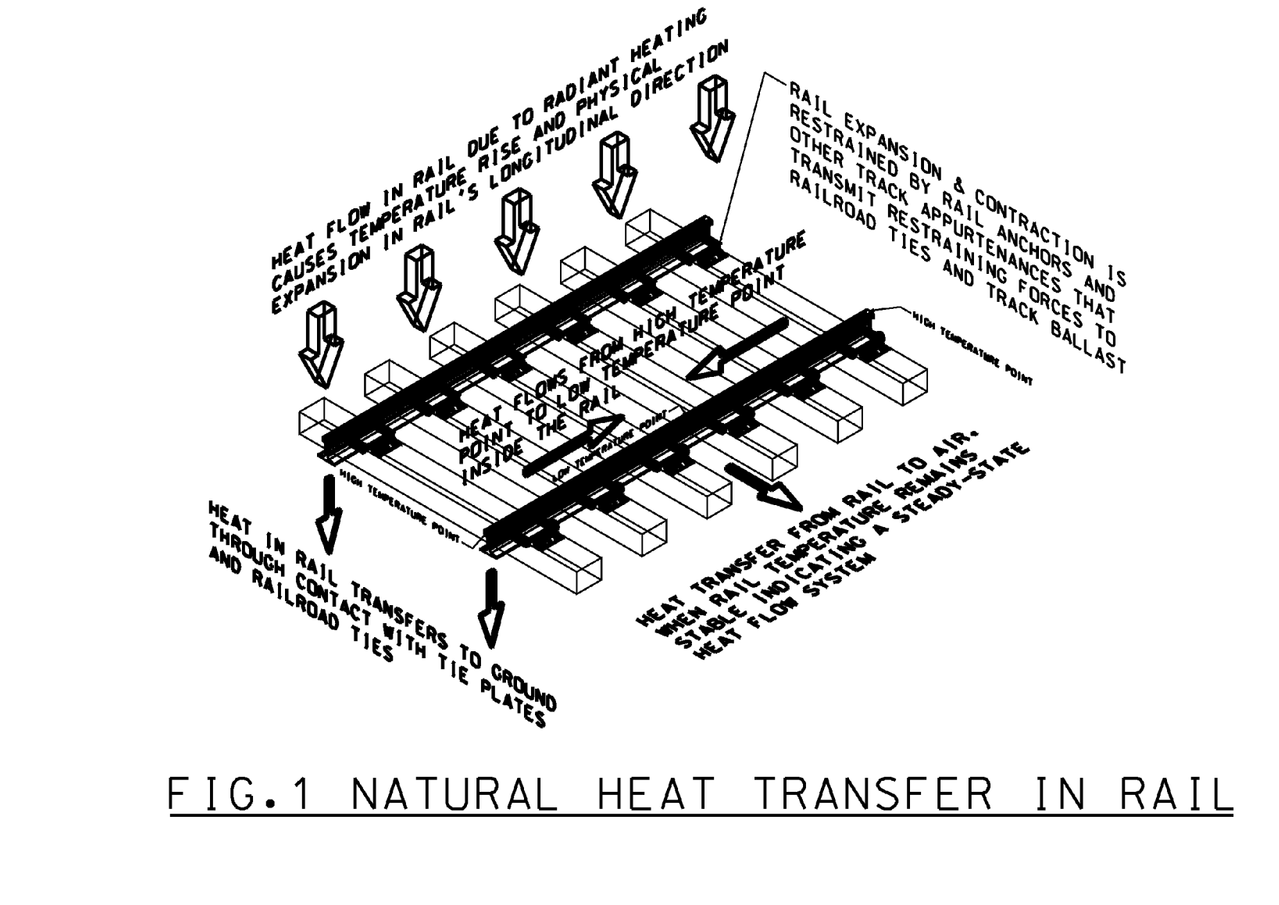
FIG. 1 is the isometric view detailing the natural heat flow in railway track, through radiation, convection, and conduction. Radiation has the highest rate of heating effect on rail, and therefore in a steady state of heat flow rail temperature is often higher than ambient air temperature in hot summer months. Heat leaving the rail by convection and by conduction to the air and the ground respectively is relatively insignificant in comparison to the heat received by radiation.
Figure 2:
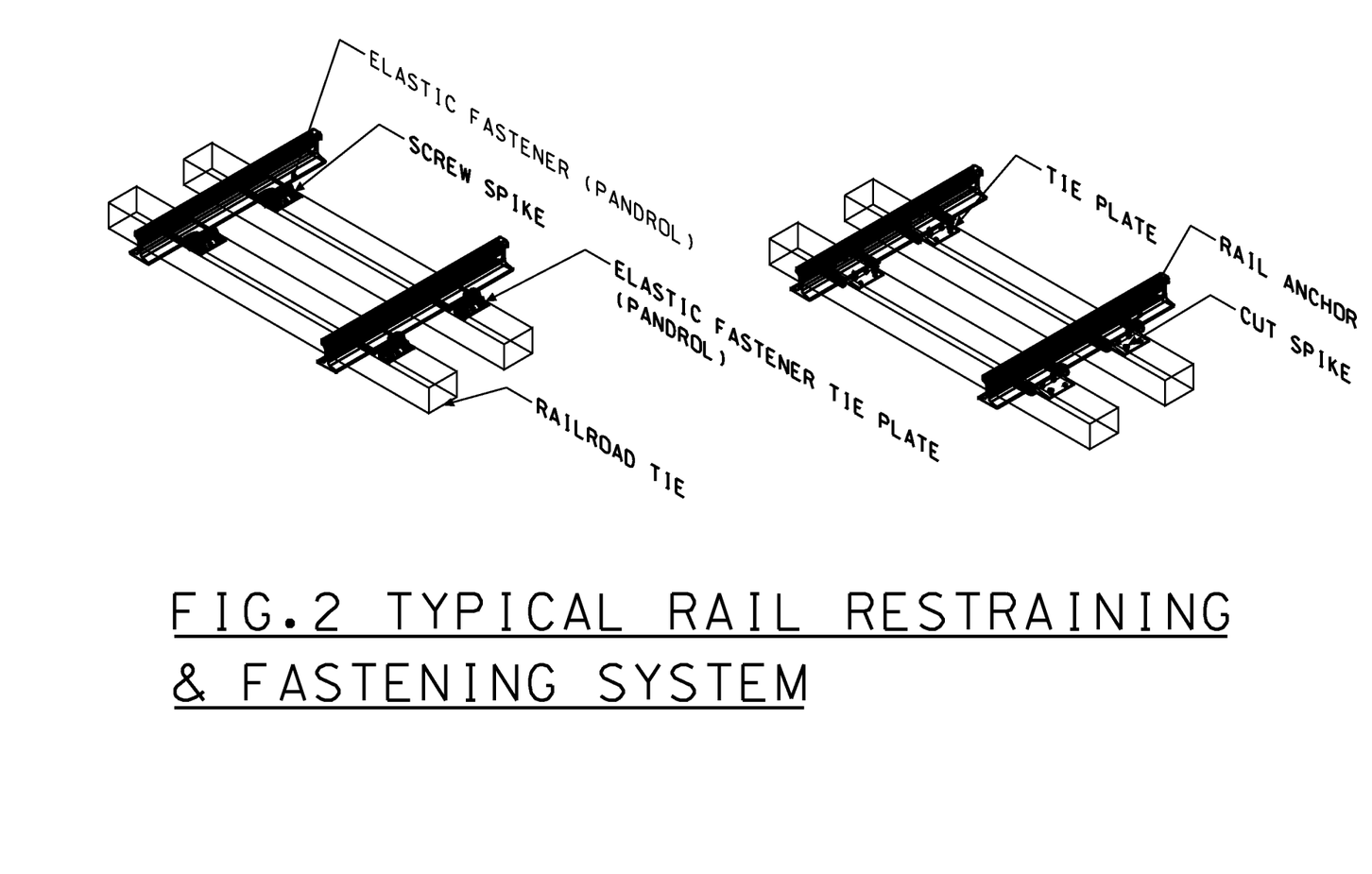
FIG. 2 depicts the details of method in restraining rail movements by prior art using rail anchors and elastic fasteners. Rail anchors are made of high carbon steel with stiff elasticity and are applied with a track hammer to clip on the base of rail against both edges of the railroad tie. The spring action of rail anchor crimps on the rail base tightly and uses the tie for bearing support against longitudinal movement. Elastic fasteners are made of similar steel and used with special tie plate to provide hold down and anchoring against rail movement. Nominal design toe load by elastic fasteners is in the range of 2,250 to 2,750 lbs. per clip, or in excess of 4,500 lbs. per rail seat.
Figure 3:
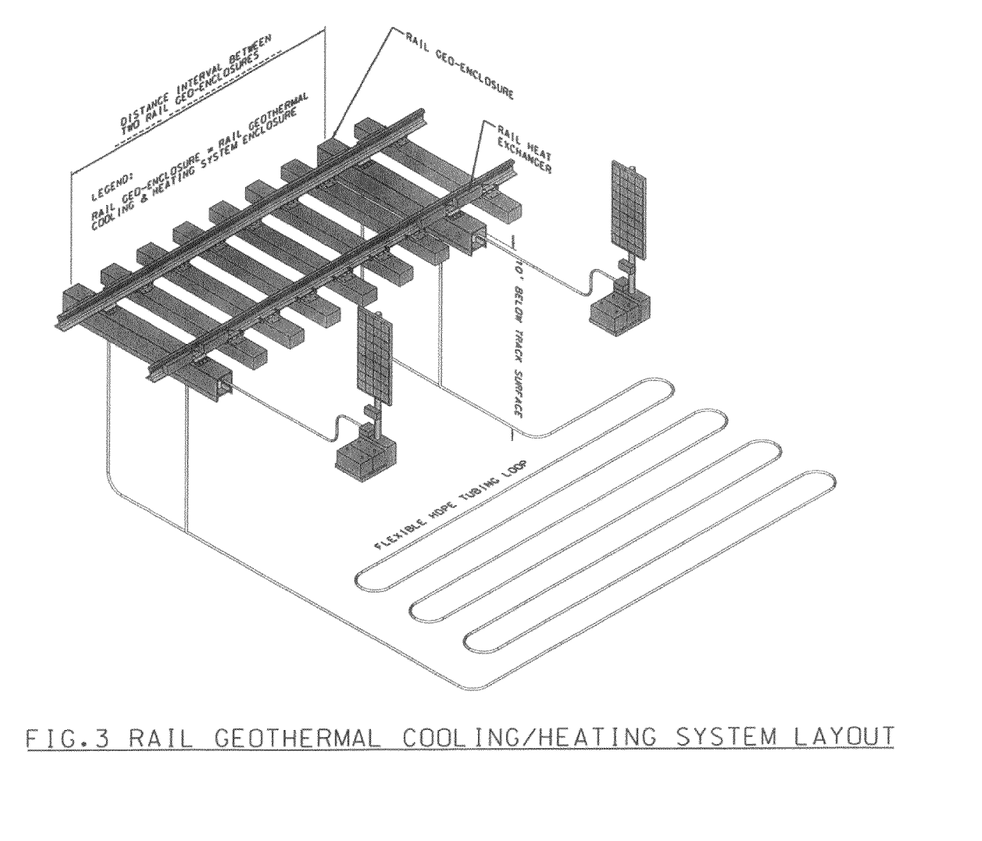
Figure 4:
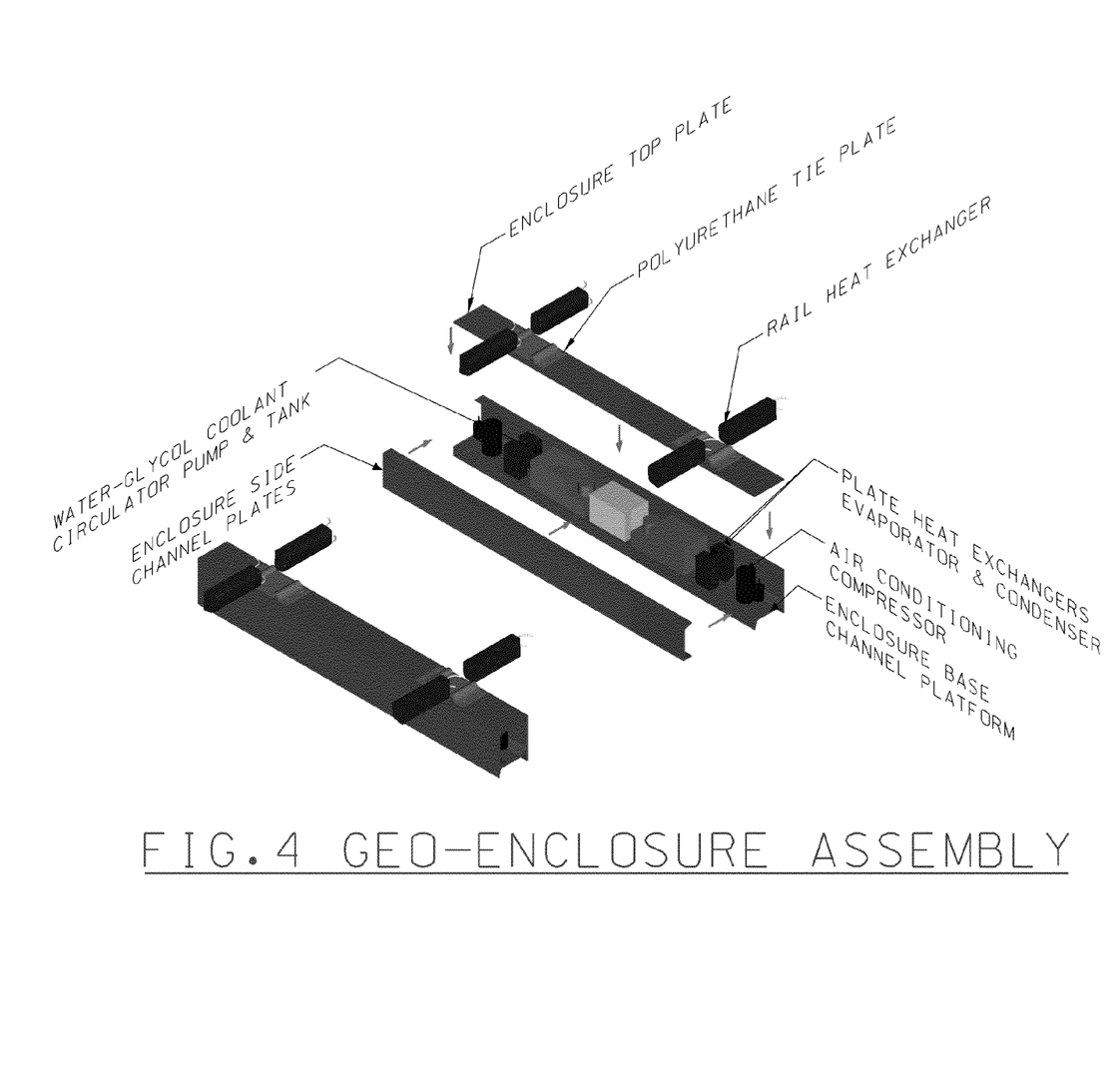
Figure 5:
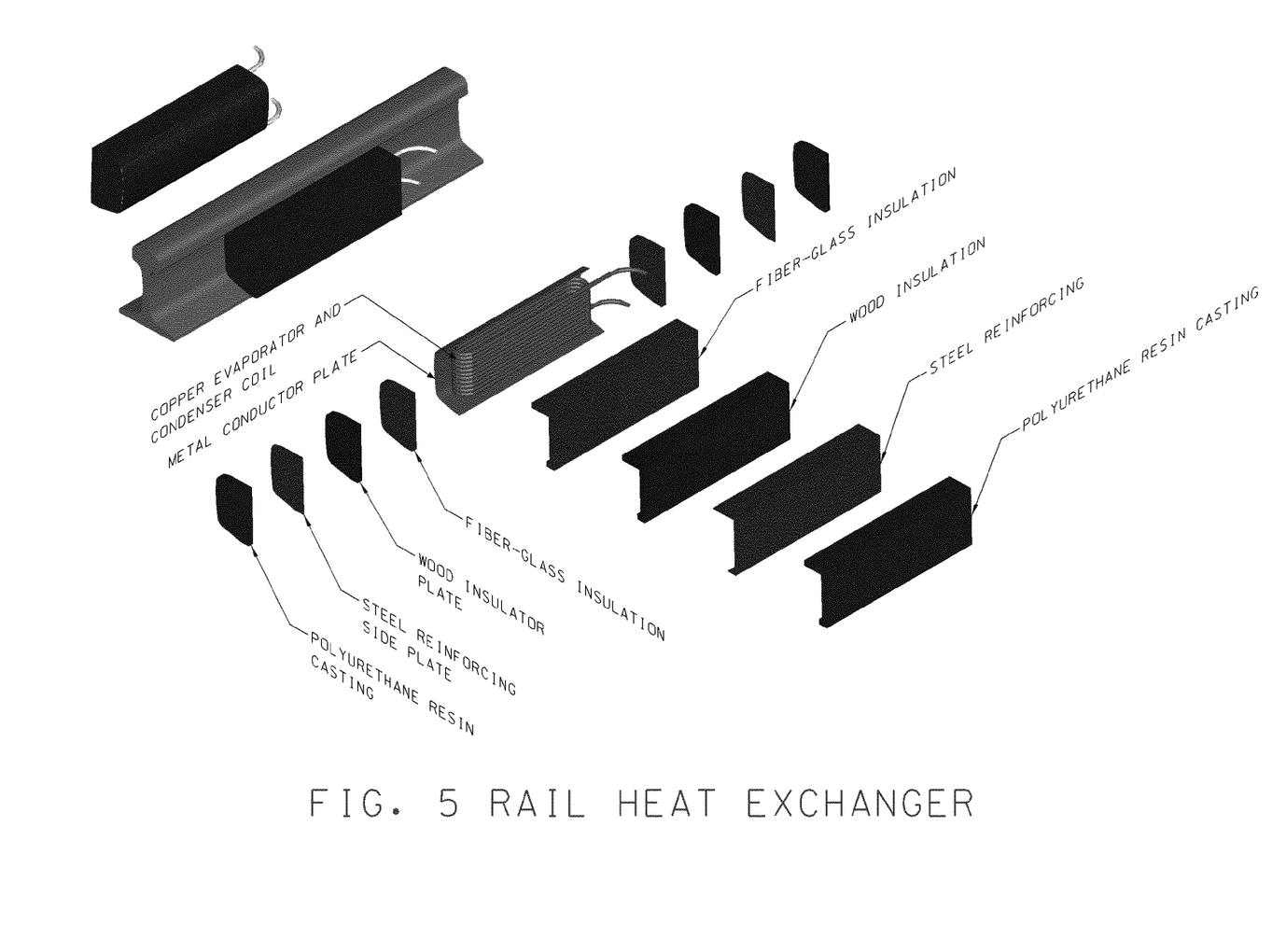
FIG. 5 depicts the break-apart view of the Rail Heat Exchanger and shows how the process work by utilizing heat transfer principles of conduction and forced convection with the specially shaped conductor plate and the copper heat exchanger coil. It also reveals the design of uni-directional heat transfer and construction criteria by displaying all layers of insulation, reinforcing, and structural materials.
Figure 6:
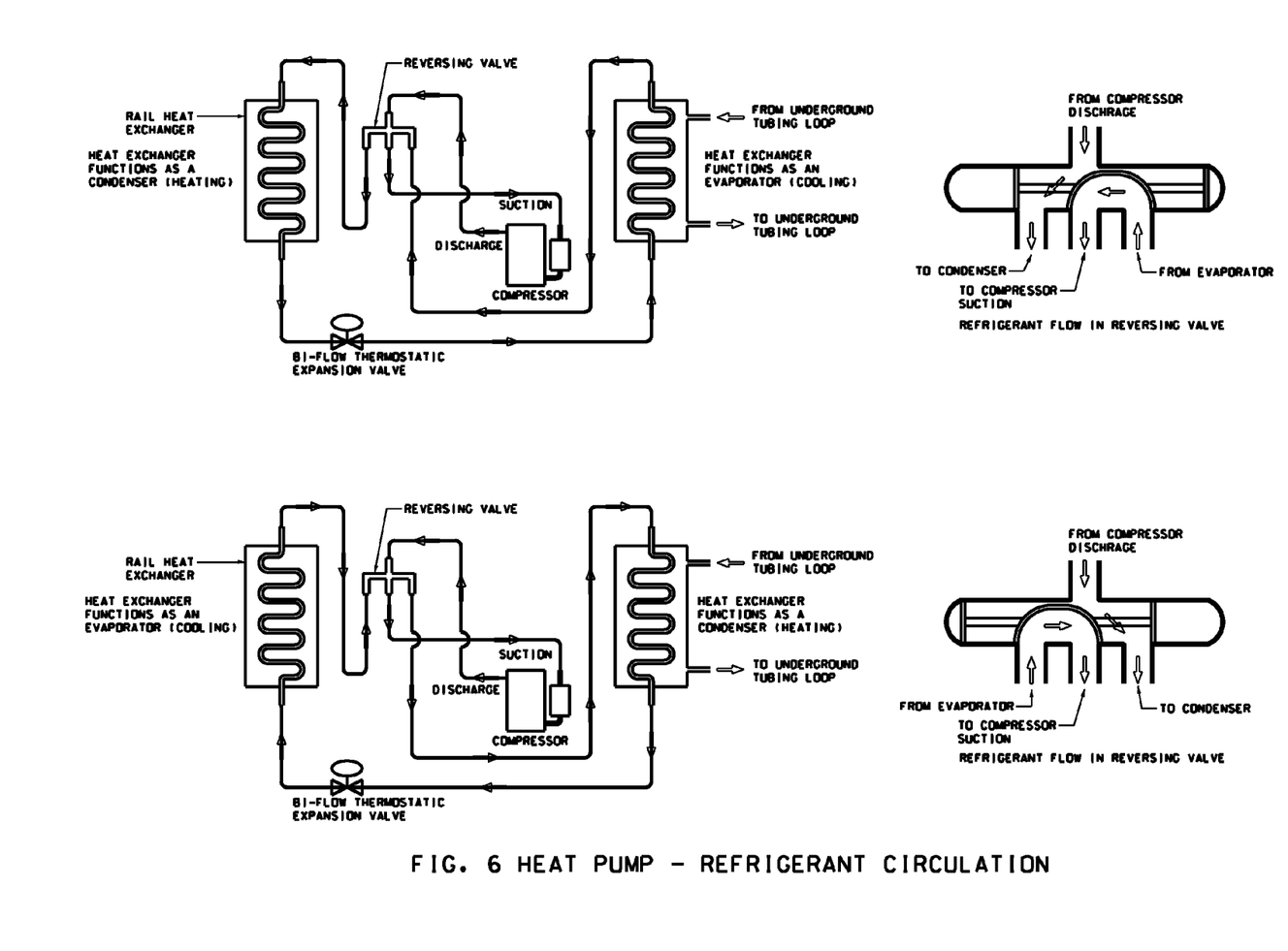
FIG. 6 depicts the details of reversible refrigerant circulation for the Geothermal Rail Cooling and Heating system. By switching the flow direction of discharged refrigerant vapor through the reversing valve, the function of Rail Heat Exchanger in cooling or heating is alternated.
Figure 7:
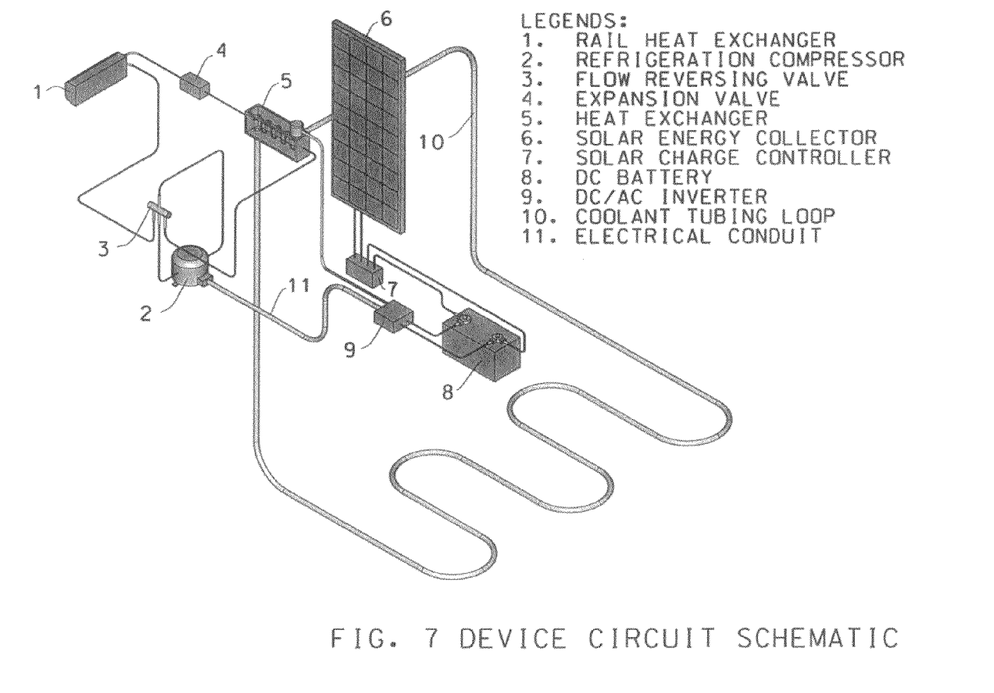
FIG. 7 illustrates the details of the system refrigeration and power circuitry as a whole operative device. The graphical presentation for the components is for schematic illustration only.
Figure 8:
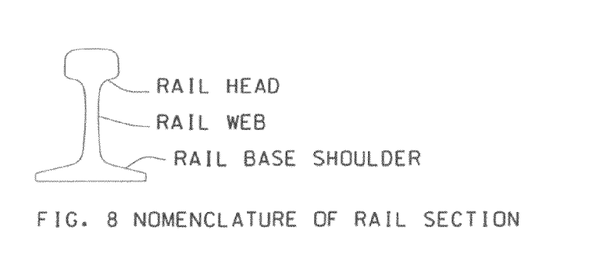
FIG. 8 specifies the nomenclature for surface areas of a rail section in contact with the rail heat exchanger, namely the area under the rail head, the area of rail web, and the area of rail base shoulder.

This invention is a technology developed to accelerate heat transfer from the rail to the ground, and so it fits in the criteria of geothermal application. The paramount important component of this invention is the Rail Heat Exchanger, without it there is no practical means to facilitate heat transfer from the rail. Attention must be given in the fabrication of the heat conductor plate of this component. Its shape of the exact match to the rail web profile with tight fit is critical to ensure efficient heat transfer. The choice of material can either be copper or aluminum. The heat exchanger coil must be made of refrigeration grade copper tubing type "L". For mass production, it may be advantageous to consider investment casting of the conductor plate and the heat exchanger coil together as one single unit similar to the design of a brazed plate heat exchanger. Due to the variety of rail profiles used in track, dimensional limitation requires adjustments in design to maintain heat flow balance of conduction and forced convection for optimum performance. Another important aspect of this invention is to accelerate heat transfer between rail and the ground by uni-directional transfer through the conductor plate of the Rail Heat Exchanger. Therefore the component is well insulated with multiple layers of good insulation material from preventing absorption of heat in the air, while it is also shrouded by a steel frame for structural integrity. In order to accelerate heat flow in an aggressive manner, the system utilizes a refrigeration heat pump as the thermodynamic engine to work with the HFC R134a or R410a refrigerants. Foregoing description has explained how the condensing and evaporating cycles work the cooling process, and by reversing the flow of coolant through the heat exchangers, heating effect is provided. All the component parts used in the heat pump arrangement may be common industrial air conditioning or refrigeration parts that should be sized to application needs with considerations given to the choice of power supply and the size of component parts that need to fit in the Geo-enclosure. It is also important for individual of ordinary skill to realize that the objective of this invention is to enhance the existing railroad practice, but not to replace it. Rail-laying at the desirable neutral temperature and rail restraining accordingly, usually in between 95° F. to 115° F., is a common practice by most railroads. Actual rail temperature in hot summer months normally reaches in between 135° F. to 145° F., however unpredictable it may change from place to place. Quantitatively, the cooling effect from the Geothermal Rail Cooling and Heating system is only required to bring the rail temperature down by about 35° F., just to get in the range of the neutral temperature when the rail is first laid. There is no requirement for the system capability to deliver deep chilling effect or freezing temperature to a chunk of rail, unlike what is needed in the perishable food industry. In another aspect, person of ordinary skill in the art needs to know a long length of rail absorbs heat and its temperature rises rapidly in the sun, but it also releases the heat back out to the atmosphere and the ground, although in a relatively slower rate and may not in a steady-state manner. Therefore the actual temperature taken on the rail is merely a reflection of its in-situ condition at that location. The rate of heat flow fluctuates constantly along the track and so does the rail temperature. So in contrast to foregoing inconsequential need for powerful system capability, qualitatively the system must have the capacity to sustain a minimum temperature gradient at the interface between the conductor plate and the rail web contact area per design objective as intended. Surface area where the conductor plate of Rail Heat Exchanger makes contact with the 136 1b. RE rail is about 8¼"×16", an area of 132 in² or 0.9167 Ft². In comparison to the rail's cross-sectional area of 0.0929 Ft², there is a significant difference between the two modes of heat transfer. Obviously the extraction of heat from the larger rail web area is far more efficient than heat flow inside the rail along its own length. Therefore, as suggested in FIG. 3, multiple units of Geo-enclosures strategically positioned in series in track location susceptible to track bucking or sun kink are more effective in assuring adequate coverage.

It will be readily seen by one of ordinary skill in the art that the present invention fulfills all objectives in the application and production of such set forth above. After reading the foregoing description, one of ordinary skill will be able to effect various changes, substitutions of equivalents and various other aspects of the invention as broadly disclosed herein. It is therefore intended that the protection granted hereon be limited only by definition contained in the appended claims and equivalents thereof.

The invention claimed is:

1. A Geothermal Rail Cooling and Heating System consisting of:
   a. a rail heat exchanger as a fabricated or cast composite device attached to the steel rail in railway track;
   b. a thermodynamic machine configured as a compressor heat pump circulating the refrigerant;
   c. a solar energy collector device and battery system or an AC electrical power supply;
   d. a structural enclosure for housing all system components and providing support to the track structure;
   e. an underground tubing loop including a water circulation pump to circulate water-glycol solution coolant through the condensing heat exchanger for the dissipation or the absorption of heat in the ground.

2. The geothermal rail cooling and heating system of claim 1, wherein the system reduces thermal expansion or contraction of steel rail in railway track as a result of transferring heat between the rail and the earth by energizing the compressor with electrical power to circulate a refrigerant throughout the refrigeration circuit, including the suction and discharge lines, the evaporator coil, the condenser coil, the expansion valve, and the flow reversing valve.

3. The geothermal rail cooling and heating system of claim 2, wherein the system conducts heat transfer with the rail by means of a rail heat exchanger containing a copper coil and a metal conductor plate that is shaped to conform to the side profile of the rail section for maximum contact.

4. The geothermal rail cooling and heating system of claim 3, wherein the cooling mode, the heat in the rail of railway track is transferred through the metal conductor plate to the evaporator coil inside the rail heat exchanger while the other exterior surfaces exposed to the atmosphere are insulated to allow directional conduction of heat in mating surfaces between the rail and rail heat exchanger.

5. The geothermal rail cooling and heating system of claim 4, wherein the rail heat exchanger conducts heat by means of a metal conductor plate fit tightly under the rail head, in rail web, and on the rail base shoulder, so that the rail head and rail base shoulder support and protect the rail heat exchanger from the movement of train wheels.

6. The geothermal rail cooling and heating system of claim 5, wherein the rail heat exchanger serves both functions as an evaporator or a condenser in rail heat transfer as determined by the direction of refrigerant flow.

7. The geothermal rail cooling and heating system of claim 6, wherein the reduction of thermal stresses in railway track is conducted by evaporation and condensation of a refrigerant circulating through the rail heat exchanger of the said system.

8. The geothermal rail cooling and heating system of claim 7, wherein the system cooling mode, after compression the refrigerant vapor in high temperature and high pressure is discharged through the discharge port of the compressor and through the flow reversing valve to the condensing heat exchanger in where the vapor condenses into liquid by giving up heat to the water-glycol solution coolant that subsequently circulates and exchanges heat in tubing loop underground.

9. The geothermal rail cooling and heating system of claim 8, wherein the system cooling mode and after passing through the expansion valve, the refrigerant transforms from liquid to vapor and extracts heat from the surrounding while conducting a phase change in the cooper coil inside the rail heat exchanger and carrying the extracted heat energy into the suction port of the compressor for the repeating cycle.

10. The geothermal rail cooling and heating system of claim 9, wherein operation of the refrigeration compressor is supported by a solar energy collector device and battery system or an AC electrical power supply.

11. The geothermal rail cooling and heating system of claim 10, wherein the system utilizes the solar energy as a power source and counter measure to resolve the problem of track buckling caused by radiation heating from the sun.

12. The geothermal rail cooling and heating system of claim 11, wherein the function of cooling or heating the rail is accomplished by switching the flow direction of refrigerant through the system reversing valve.

13. The geothermal rail cooling and heating system of claim 12, wherein the actual temperature rises up in the rail and reaches the threshold for track buckling to occur, the system cooling mode is activated to provide cooling effect to the rail and reduce its compressive stresses.

14. The geothermal rail cooling and heating system of claim 13, wherein by switching over to the heating mode, when the actual rail temperature drops down in cold weather and approaches the threshold for rail pull apart, the rail heat exchanger conducts heat to the rail for relief of tensile stresses caused by rail contraction.

15. The geothermal rail cooling and heating system of claim 14, wherein other than the rail heat exchanger and the solar energy collector device, all other system components are assembled on a platform within the structural enclosure that represents a railroad cross tie spanned underneath the railroad track with connection to a tubing loop of water-glycol solution coolant in the ground to complete the heat transfer process of the said system.

* * * * *